Figure 1:
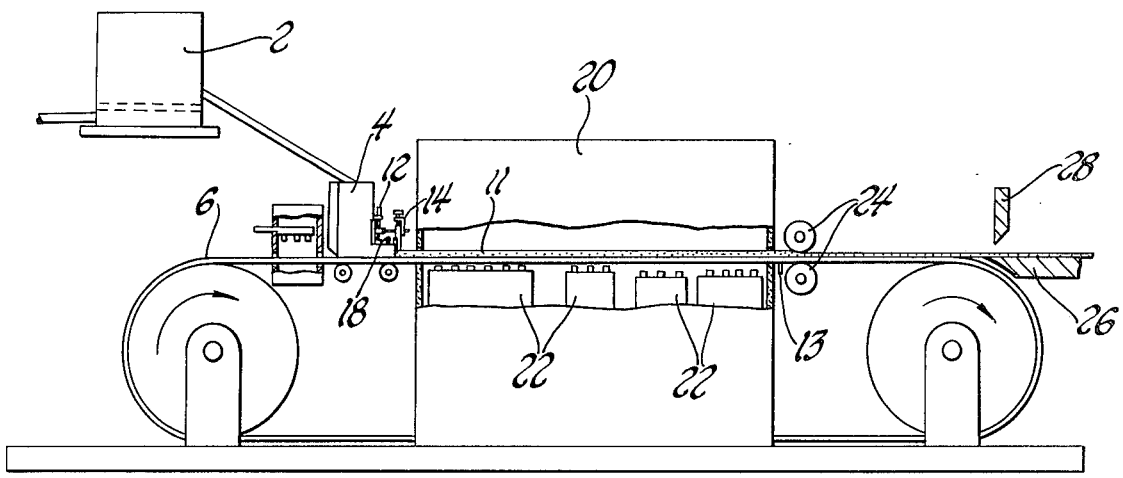

United States Patent [19]

Riesberg, Jr.

[11] 4,252,756
[45] Feb. 24, 1981

[54] PROCESS FOR MANUFACTURING ULTRA-THIN SINTERED PVC BATTERY SEPARATORS

[75] Inventor: Van V. Riesberg, Jr., Anderson, Ind.

[73] Assignee: General Motors Corporation, Detroit, Mich.

[21] Appl. No.: 52,472

[22] Filed: Jun. 27, 1979

Related U.S. Application Data

[63] Continuation-in-part of Ser. No. 804,916, Jun. 9, 1977, abandoned.

[51] Int. Cl.³ .................... B29D 27/00; B29D 27/08
[52] U.S. Cl. ............................... 264/49; 264/54; 264/126; 264/DIG. 5; 429/254
[58] Field of Search ............ 264/49, 54, 126, DIG. 5; 429/254

[56] References Cited

U.S. PATENT DOCUMENTS

| | | | |
|---|---|---|---|
| 3,002,040 | 9/1961 | Orsino et al. | 136/146 |
| 3,123,654 | 3/1964 | Malischewski | 264/126 |
| 3,518,332 | 6/1970 | Sklarchuk et al. | 264/49 |
| 3,551,210 | 12/1970 | Bahler et al. | 136/148 |
| 3,784,490 | 1/1974 | Rainer et al. | 264/49 X |

FOREIGN PATENT DOCUMENTS

| | | | |
|---|---|---|---|
| 1191560 | 4/1965 | Fed. Rep. of Germany | 264/49 |
| 885825 | 12/1961 | United Kingdom | 264/49 |

*Primary Examiner*—Philip Anderson
*Attorney, Agent, or Firm*—Lawrence B. Plant

[57] ABSTRACT

Dry mixed and sintered PVC battery separators having predetermined thicknesses less than 0.012 inch, porosities greater than about 50%, and pores sufficiently small to substantially prevent interplate "treeing" (i.e., less than about 10 microns average) are produced by: mixing about 3% to about 15% by volume of leachable, pore-forming particles with the PVC particles; scraping the particle mix into a layer less than about 0.012 inch thick; sintering the PVC into a continuous strip; compressing the strip in the temperature range of about 250° F.–450° F. to a thickness no greater than about 50% of its as-sintered thickness; thereafter immediately allowing the strip to recover much, but not all, of its as-sintered thickness; and cooling the strip to substantially fix the separator thickness at the recovered thickness. The leachable, pore-forming particles are preferably formed in situ by the thermal degradation of a gasifiable filler such as sodium bicarbonate.

5 Claims, 2 Drawing Figures

PROCESS FOR MANUFACTURING ULTRA-THIN SINTERED PVC BATTERY SEPARATORS

BACKGROUND OF THE INVENTION

This application is a continuation-in-part of U.S. patent application Ser. No. 804,916, filed June 9, 1977 in the name of Van V. Riesberg, Jr. and assigned to the assignee of this application and now abandoned.

This invention relates to a dry-sintering process (i.e., without solvents, plasticizers, etc.) such as described in Bahler et al U.S. Pat. No. 3,551,210, filed in the U.S. Feb. 3, 1969 and assigned to the assignee of the present invention. More specifically, the invention relates to dry-sintering PVC battery separators in thinner (i.e., less than 0.012 inch) strips than it was practically possible to do heretofore without materially reducing the separator's strength, its "treeing" resistance and its electrical conductivity in the battery.

Battery separators function essentially to electrically isolate the positive and negative plates from each other. They prevent direct contact and suppress "treeing" or interelectrode dendrite growth which causes shorting of the respective plates. An ideal separator would isolate the plates without inhibiting electrolyte mobility, and without increasing the battery's internal resistance. The separator manufacturer's ability to achieve the ideal, however, is thwarted by practical manufacturing limitations. Processes are sought which will yield maximum total porosity and thinness (i.e., for achieving low electrical resistance), and minimum pore size (i.e., for achieving maximum "treeing" resistance). The relationship that exists between the total porosity and size of the pores defining that porosity for a separator of given thickness can be quantitatively characterized in terms of the separator's air permeability according to the Gurley porisimeter method and is referred to herein as the separator's "porosity profile."

Heretofore, high-speed, dry-sintering processes of the Bahler et al-type have been able to produce separators having thicknesses as low as 0.014 inch and total porosities of about 50%, but with average pore sizes no less than about 14 microns. With pores this large, the 0.014 inch thickness is necessary to provide adequate strength and "treeing" resistance. Prior to the present invention, Bahler et al-type processes have not been able to produce acceptable separators less than 0.012 inch thick at commercially practical rates. Moreover, separators that have been made have proven unacceptable for applications such as Pb-Ca maintenance-free batteries which have a higher "treeing" resistance requirement not met by the larger pores in the thinner separators. In this regard then, acceptable separators are herein intended to mean those which have an electrical resistance (i.e., at 80° F.) which does not exceed about 0.0012 Ohms/inch$^2$ for each 0.001 inch of web thickness, and have a tree resisting, porosity profile yielding an air permeability of not less than 24 secs for passing 300 ccs of air in a Model 4100 Gurley Densometer with a 0.025 inch$^2$ orifice and a 5 oz. weight (i.e., 24 Gurley). Separators with Gurleys above about 60 secs, on the other hand, tend to have too high a resistance for most applications.

It is an object of the present invention to provide a commercially practical dry-sintering method for making PVC separators which are less than 0.012 inch thick yet have a porosity profile resulting in high "treeing" resistance and low electrical resistance. This and other objects of this invention will become more apparent from the detailed description which follows.

THE INVENTION

The Invention comprehends: sintering PVC powder mixed with about 3% to about 15% by volume of leachable, pore-forming particles which are less than about 10 microns in diameter (average); warm deforming or calendaring of the sintered mix at a temperature above 250° F. to reduce the as-sintered pore size without collapsing them, and to stabilize the strip against in-service growth; and then leaching out the particles leaving only the smaller pores. Earlier attempts to reduce the pore size by simply calendaring the sintered sheet but without the pore-formers or with the pore-formers but at too high a temperature only increased the electrical resistance to an unacceptable level. Moreover, calendaring at too low a temperature following sintering would not fix the separator's thickness against in-service expansion as will be pointed out hereinafter.

The pore-forming particles used in combination with the warm deformation step preferably range from about 1 to about 7 microns in diameter and have the average particle size of less than about 4 microns. Preferably, the pore-forming particles are comprised of materials which are gasifiable under PVC sintering conditions (i.e., evolve a gas in the sintering oven) yet leave soluble (i.e., in acid or water) residue amongst the PVC. One such preferred gasifiable material is sodium bicarbonate which gives off about 20% of its weight as $CO_2$ at 410° F. and leaves somewhat smaller (i.e., about 10%) sodium carbonate particles in their stead. A particular advantage of sodium bicarbonate over other gasifiable pore-formers is that its bulk density (i.e., ca 0.47 g/cc) is near that of the PVC (i.e., ca 0.53 g/cc) which greatly simplifies mixing and fluidization of the PVC-bicarb mixes.

In carrying out the process of this invention, the mix is spread onto a moving metal belt as a layer less than 0.014 inch thick (usually about 0.010 inch). The particle layer is heated as it passes through an elongated oven to sinter the PVC particles into a continuous strip. Following sintering, the strip is compressed at temperatures in the range of about 250° F.–450° F. between calendar rolls to a thickness which is no greater than about one-half (preferably about one-third) its as-sintered thickness. This warm compression deforms the warm PVC particles, improves their bond strength to each other and shrinks the pores between them. In this step, the leachable particles serve to prevent collapse of the pores and, like a core in molding, to some extent generally defines the pores themselves.

Following compression, the still warm strip elastically recovers much, but not all, of its lost thickness and hence remains somewhat permanently deformed. More specifically, it recovers about 75% to about 90% (i.e., preferably about 90%) of its as-sintered thickness. The precise amount of recovery in each instance will vary with the degree of compression and the compression temperature used. In this regard, it has generally been observed that greater compression is required at the lower compression temperature (i.e., nearer 250° F.) to achieve the desired pore size and recovery than is needed at the higher compression temperatures.

Following recovery, the strip is cooled to fix the post-compression thickness achieved at the exit of the calendaring rolls. The leachable pore-forming particles remain with the PVC throughout the foregoing, but are ultimately removed by the time the battery is in service. In this regard, they may be immediately removed as by a distinct leaching step, but preferably are left in situ and are ultimately removed in the battery by the action of the acid therein. The particular combination of process parameters (e.g., composition, layer thickness, sintering time/temperature, and degree and temperature of compression, etc.) is chosen to achieve a particular design thickness after the calendaring rolls. Following cooling and fixing of the separator's thickness, the separator strip is ready for cutting and forming into individual separators or separator-envelopes according to the many techniques known to those skilled in the art. Conventional spacer ribs may be formed on the separator at the time the powder layer is spread onto the belt during calendaring or at any other time as is well known to those skilled in the art.

Warm compression at temperatures in excess of 250° F. following sintering has been found essential to fix the post-compression thickness against further growth during the service life of the battery. In this regard, it has been observed that when the PVC is compressed at temperatures less than about 250° F., an initial partial elastic recovery occurs immediately after compression, but that this thickness is not permanent and a secondary elastic recovery later occurs in the battery in service which unduly internally stresses its elements. This problem has been particularly noticed in automobile SLI batteries located in engine compartments which see as much as 230° F. temperatures. On the other hand, strips compressed at temperatures above about 450° F. do not recover as much after compression and tend to yield separators with unnecessarily high electrical resistance.

As indicated, the pore-forming particles preferably gasify in the sintering oven and yield a pore-forming residue which is then leached out after the warm compression step. Most preferably, the gasifiable pore-forming particles are sodium bicarbonate in the 1 to 7 micron particle range which evolve harmless $CO_2$ and leave sodium carbonate as the residue which does not upset the battery chemistry when removed by the electrolyte in the completely assembled battery.

The Figures generally illustrate, in side elevation, apparatus for carrying out the process of the present invention.

Figure 2:
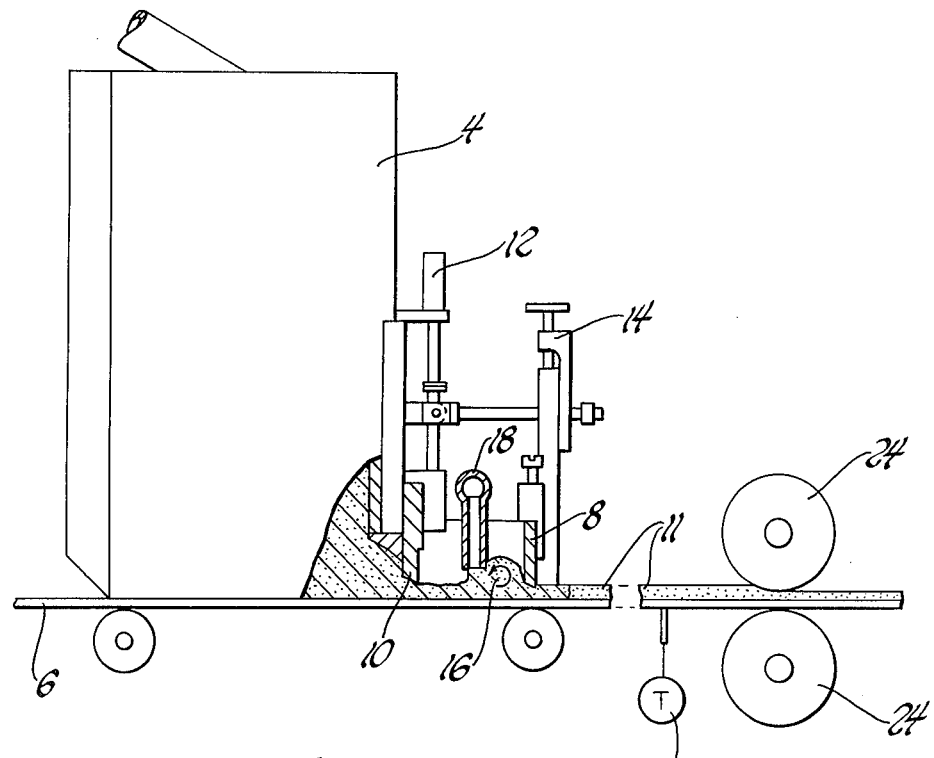

FIG. 2 is an enlargement of portions of FIG. 1.

Fixed thickness PVC battery separators can be made by the process of this invention which are less than about 0.010 inch thick, have greater than 50% porosity, have pores which are, for the most part, less than about 10 microns in diameter and have Gurley air permeabilities greater than 24 secs. The high porosity helps to keep the electrical resistance low by insuring adequate electrolyte volume and mobility within the cell while the small pore size inhibits the "treeing" through of these thin separators. Separators have been made by this invention as low as 0.008 inch thick and with an average pore size of about 7.5 microns (as determined by a mercury porosimeter Aminico Model 7-7118).

Separator-grade PVC particles useful with this invention comprise for the most part particle mixes in which the particles range in diameter from about 13 microns to about 67 microns with an average particle size of less than 36 microns. Thinner separators are made with preferred PVC particles which vary for the most part from about 15 microns to about 48 microns and have an average particle diameter of less than 30 microns. Particle sizes and distributions herein for both the PVC and pore-forming agents are as determined by a Coulter Electronics Counter Model PA11.

The pore-forming particles have an average particle size which is no greater than the 10 micron pore size sought to be obtained in the finished separator. Particular success has been obtained with sodium bicarbonate particles ranging from about 1 micron to about 7 microns in diameter and an average particle size of about 3.2 microns. The sodium bicarbonate content of the PVC-bicarbonate mix can vary from as low as about 3% to as high as about 15% by volume, but about 5% to about 10% yields consistently acceptable results. The 5% sodium bicarbonate-PVC mixes seem to achieve about the best tradeoff between acceptable electrical resistance, "treeing" resistance and handling strength. Otherwise, when the bicarbonate content falls below about 3%, the resistance of the compressed separator is unacceptably high. On the other hand, when the bicarbonate content exceeds about 15%, the separator has a lower resistance to "treeing" and is generally too weak and fragile to sustain the normal handling in the plant.

The gasifiable, pore-forming particles which leave leachable residues (i.e., $NaHCO_3$) are preferred over particles which are leachable but do not gas in the oven. In this regard, the gasifiable pore-formers yield as-sintered strips whose porosity (i.e., before compression) is higher than that predictable based solely on the volume of pore-former alone. Just why this is so is not clearly understood though it is believed that the gassing in the oven has a lofting affect on the PVC which lowers the density of the as-sintered strip prior to compressing. It is also noted that the pore-forming particles themselves grow somewhat smaller during gassing which contributes to the small pore formation achieved during the warm compression step of the process. In one example of this apparent lofting phenomena, a control sample of PVC powder (i.e., without a pore-former) was sintered and yielded as uncompressed separator with a porosity of about 50%. The same PVC powder, but with 5% by volume sodium bicarbonate added, had an uncompressed porosity of about 62% (i.e., with the carbonate residue still present). When the residue was leached out, the uncompressed porosity of the separator rose to about 65%. It has further been observed that 50% porous PVC control samples (i.e., without gassing pore-formers) have a porosity approaching only about 40% after the warm compression step whereas those containing soda, as above, are about 48% porous after warm compression (i.e., before removal of the salt), and in excess of 50% (i.e., 51%-52%) after the carbonate is leached out.

Separator strip material made in accordance with this invention may be processed in substantially the same manner as described in Bahler et al U.S. Pat. No. 3,551,210 and accordingly, for much of the detail thereof, Bahler et al is intended to be incorporated herein by reference. Generally speaking though, the Figures of this application depict apparatus like that of FIG. 2 of Bahler et al but with the addition of means for the warm compression of the separator strip following sintering. In carrying out the present process, the PVC particles are conditioned as necessary for moisture and agglomeration control followed by homogeneous mixing with the pore-forming particles. The specific means for accomplishing this is not part of the present invention but both conditioning and mixing may be conveniently achieved by known fluidization techniques.

FIG. 1 depicts a conditioning and mixing means 2 for providing the PVC-pore-forming mix to a feed hopper 4 (see FIG. 2 for enlargement). The hopper 4 dispenses the mix onto a continuous stainless steel belt 6 (i.e., about 0.032 inch thick) behind a comblike scraper blade 8 which is profiled to form conventional spacing ribs on the strip while spreading the powders. In this regard, the spacer ribs are preferably combed into the powder layer while it is being spread onto the belt as in Bahler et al, and the compression means merely compresses the webs between the ribs without appreciably acting on the ribs themselves. It is recognized, however, that the powder may be spread flat and the ribs put thereon after compression and recovery as by hot melt beading, corrugating, embossing or the like as is well known in the art.

The belt 6 moves at a rate of about 200 ft./min. under the feeding hopper 4 and thereunder receives a layer of mix having a thickness equal to about the height of the dam 10 above the belt 6. The dam 10 is positioned about 0.025 inch above the belt 6 and the comb 8 adjusted (i.e., to about 0.02 inch above the belt) to produce a 0.012 inch thick powder layer 11 downstream thereof. The height of the dam 10 and comb 8 can be varied by appropriate dam and comb adjusting means 12 and 14, respectively. Excess powders mound up behind the comb 8 which mound 16 is kept in a constant rolling or eddy-like motion by means of a vacuum skimming device 18 which is so located as to prevent excess powders upstream of the comb 8 from raising the head of the mound 16 to the point that it becomes stagnant.

The powder layer 11 flowing from under the comb 8 is then heated and sintered in a long oven 20. Preferably it is rapidly preheated (i.e., to about 375° F.) to just below its sintering temperature, and then more slowly heated to sintering of the PVC at about 410° F.–415° F. In the particular embodiment shown, the initial rapid heatup of the particles to the 375° F. presintering temperature is accomplished in the first two stages of four-stage oven 20 having gas burners 22 heating the separators through the stainless steel belt 6 which tends to form a thin skin on the bottom of the strip where the PVC is hottest. This skin has a somewhat higher density than the rest of the separator, but even here the pore-forming particles serve to keep the skin from completely sealing off that surface of the separator. The first two burners are located approximately 2 inches below the stainless steel belt 6. The first oven stage is approximately 48 feet long and the oven temperature is maintained at about 600° F. The second oven stage is about 28 feet long and is maintained at an oven temperature of about 400° F. The third and fourth oven stages finish the heating and sintering and are 28 feet and 32 feet long, respectively, and maintained at oven temperatures of about 610° F. and 475° F., respectively. It is to be appreciated that these temperature readings will vary depending on the location of the temperature sensor in each oven, but they do serve to indicate the nature of the preheating and sintering steps used to manufacture separators by the process of this invention.

After sintering, the strip is cooled to a temperature of about 250° F. to about 300° F. as determined by a temperature probe 13 (see FIG. 2 enlargement) contacting the underside of the belt 6 just before the compression means. While forced cooling would be acceptable, it appears that merely extending the length of the line between the oven exit and the compression rollers (discussed hereafter) is sufficient to permit adequate cooling before compression. At the aforesaid 250° F. to 300° F. temperature, the sintered strip enters the nip of compression rollers 24 which compress the strip between the upper roller and the belt 6. As indicated above, the compression rollers may have flat surfaces if the strip is flat or may have annular grooves for accommodating the ribs if they are already formed on the strip. In this latter case, only the portions of the rollers that are between the annular recesses compress the web portions (i.e., between the ribs) of the separator strip. Upon exiting the compressing rollers 24, the strip recovers to about 80%–95% (i.e., depending on the temperature of the PVC and degree of compression) of its as-sintered thickness before compression, which is the design thickness of the separator. Cooling to room temperature after the warm compression fixes or permanizes the thickness of the strip against further elastic recovery and swelling while in service. Finally, the strip is peeled from the belt 6 as by a stripper means 26 and cut into desired lengths as by blade 28.

0.010 inch thick PVC separators compressed (i.e., at about 275° F.) to about one-third their as-sintered thickness using the preferred 5% $NaHCO_3$ mix have demonstrated resistances of about 0.010 ohms/inch$^2$ and Gurley air permeabilities of about 30 secs. With the same material, 0.012 inch thick PVC separators made this way have demonstrated 0.013 ohms/inch$^2$ Gurley air permeabilities of about 42 secs. With the same material, 0.008 inch thick separators made this way have demonstrated 0.009 ohms/inch$^2$ resistance and Gurley air permeabilities of about 33 secs. These resistance measurements were determined in a typical battery separator test cell at 80° F. using 1.280 specific gravity $H_2SO_4$. Higher belt speeds (i.e., up to about 300 ft/min) may be used if the oven temperatures are increased and the compression rollers are cooled (i.e., about 100° F.–200° F. surface temperatures). For example, acceptable separators have been made at the rate of 240 ft/min under conditions where the first oven stage varied from 450° F.–600° F. and the second, third and fourth stages were held to about 490° F., 610° F. and 640° F. respectively ±40° F. per stage. Under these conditions, the strip exits the oven and enters the nip of the rollers at temperatures as high as about 450° F. To effect satisfactory compression at these temperatures, the rollers were water cooled to a surface temperature of about 170° F., and the strip compressed to about 30% of its as-sintered thickness (i.e., 70% thickness reduction). Following compression, the strip is immediately cooled by spraying the underside of the belt with 65° F.–80° F. water.

It is theorized that at the higher belt speeds, only the surfaces of the PVC particles achieve the higher temperatures (i.e., 450° F.) observed while the core of the particles remain at a lower temperature. This theory is reinforced by the observation that any delay in cooling the strip after exiting the rollers causes greater initial coalescence of the particles on the belt and eventual complete charring of the strip.

While this invention has been described in terms of certain embodiments thereof, it is not intended to be restricted thereto, but rather only to the extent defined hereafter in the claims which follow.

The embodiments of the invention in which an exclusive property or privilege is claimed are defined as follows:

1. In the method of making microporous battery separators by the dry-sintering process including the principal steps of spreading dry PVC particles into a thin layer on a moving belt, heating the layer to a temperature sufficient to sinter the particles to form a continuous electrolyte-permeable strip comprising a multiplicity of interconnected pores and cutting the strip into individual separators, the improvement comprising:

mixing the PVC with leachable pore-forming particles of less than about 10 microns average, said pore-forming particles serving to control the formation of substantially comparably sized pores throughout the strip during subsequent processing;

spreading the mix on said belt to a layer thickness of less than 0.012 inch prior to said sintering;

following sintering, cooling the strip to a temperature greater than about 250° F. but less than the sintering temperature;

compressing and elastically deforming said strip at said cooled temperature, said compression being such as to reduce its as-sintered thickness by at least one-half, and to deform the PVC substantially about said pore-forming particles, said pore-forming particles serving to prevent collapse of said pores at the sites of said pore-forming particles during compressing; thereafter and while still at substantially said cooled temperature, permitting the strip to elastically recover much, but not all, of its as-sintered thickness, the extent of recovery being largely a function of the temperature and degree of said compression; and cooling said strip to substantially fix the thickness of said strip at said recovered thickness thereafter and throughout its in-service life;

the amount of said pore-forming particles, and the extent and temperature of said compression being such that upon removal of said pore-forming particles from the strip, the strip will have a porosity profile of at least 24 secs Gurley air permeability (i.e., 300 cc, 0.025 inch$^2$ orifice and 5 oz. weight).

2. In the method of making microporous battery separators by the dry-sintering process including the principal steps of spreading dry PVC particles into a thin layer on a moving belt, heating the layer to a temperature sufficient to sinter the particles to form a continuous electrolyte-permeable strip comprising a multiplicity of interconnected pores and cutting the strip into individual separators, the improvement comprising:

mixing the PVC with leachable pore-forming particles of less than about 10 microns average, said pore-forming particles serving to control the formation of said pores during subsequent processing;

spreading the mix on said belt to a layer thickness of less than 0.012 inch prior to said sintering;

following sintering, compressing and elastically deforming said strip at a temperature of about 250° F.–450° F., said compression being such as to reduce said strip's as-sintered thickness by at least one-half, and to deform the PVC substantially about said pore-forming particles, said pore-forming particles serving to prevent collapse of said pores at the sites of said pore-forming particles during compressing;

thereafter and while still at substantially said compression temperature, permitting the strip to elastically recover much, but not all, of its as-sintered thickness, the extent of recovery being largely a function of the temperature and degree of said compression; and cooling said strip to substantially fix the thickness of said strip at said recovered thickness thereafter and throughout its in-service life;

the amount of said pore-forming particles, and the extent and temperature of said compression being such that upon removal of said pore-forming particles from the strip, the strip will have a porosity profile of at least 24 secs Gurley air permeability (i.e, 300 cc, 0.025 inch$^2$ orifice and 5 oz. weight).

3. In the method of making microporous battery separators by the dry-sintering process including the principal steps of spreading dry PVC particles into a thin layer on a moving belt, heating the layer to a temperature sufficient to sinter the particles to form a continuous electrolyte-permeable strip comprising a multiplicity of interconnected pores and cutting the strip into individual separators, the improvement comprising:

mixing the PVC with leachable pore-forming particles whose average particle size is less than about 10 microns, the mix comprising about 3% to about 15% by volume of the pore-forming particles;

spreading the mix on said belt to a layer thickness of less than about 0.012 inch prior to sintering;

following sintering, cooling the strip to a temperature of about 250° F. to about 300° F., and thereat compressing said strip sufficiently to reduce its as-sintered thickness by at least one-half and to deform the PVC substantially about said pore-forming particles, said pore-forming particles serving to prevent collapse of said pores at the sites of said pore-forming particles during compressing;

thereafter and while still at substantially said cooled temperature, permitting the strip to elastically recover much, but not all, of its as-sintered thickness, the extent of recovery being largely a function of the temperature and degree of said compression; and cooling said strip to substantially fix the thickness of said strip at said recovered thickness thereafter and throughout its in-service life;

the said pore-forming particles being present throughout said steps but ultimately leached from the sintered strip, whereby battery separators are produced which are less than 0.012 inch thick, and comprise more than about 50% by volume interconnected pores and have an average pore size of less than about 10 microns.

4. In the method of making microporous battery separators by the dry-sintering process including the principal steps of spreading dry PVC particles into a thin layer on a moving belt, heating the layer to a temperature sufficient to sinter the particles to form a continuous electrolyte-permeable strip comprising a multiplicity of interconnected open-cell pores and cutting the strip into individual separators, the improvements comprising:

mixing the PVC with pore-forming particles which are gasifiable during sintering to yield a leachable particulate residue the average particle size of which is less than about 10 microns, the mix comprising about 3% to about 15% by volume of the pore-forming particles;

spreading the mix on said belt to a layer thickness of less than about 0.012 inch prior to sintering;

following sintering, compressing and elastically deforming said strip at a temperature of about 250° F.–450° F. said compressing being such as to reduce said strip's as-sintered thickness by at least one-half and to reduce the size of the pores in the strip;

thereafter and while still at substantially said compression temperature, permitting the strip to elastically recover much, but not all, of its as-sintered thickness, the extent of recovery being largely a function of the temperature and degree of said compression; and cooling said strip to substantially fix the thickness of said strip at said recovered thickness thereafter and throughout its in-service life;

the said pore-forming particles being present throughout said steps but ultimately leached from the sintered strip and the temperature and extent of compression being selected so as to produce battery separators which are less than 0.012 inch thick, more than about 50% by volume interconnected pores and have an average pore size of less than about 10 microns.

5. In the method of making microporous battery separators by the dry-sintering process including the principal steps of spreading dry PVC particles into a thin layer on a moving belt, heating the layer to a temperature sufficient to sinter the particles to form a continuous electrolyte-permeable strip comprising a multiplicity of interconnected open-cell pores and cutting the strip into individual separators, the improvement comprising reducing the pore size and thinness of the strip without sacrificing needed strength, porosity and resistance to treeing by:

mixing the PVC with particulate sodium bicarbonate, the average particle size of which is between about 1 and 7 microns, the mix comprising about 3% to about 15% by volume of the pore-forming particles;

spreading the mix on said belt to a layer thickness of less than about 0.012 inch prior to sintering;

following sintering, compressing said strip to about one-third of its as-sintered thickness said compressing being performed at a temperature of at least about 250° F., but less than the sintering temperature; thereafter and while still at substantially said compression temperature, permitting the strip to elastically recover to at least about 80%, but not all, of its as-sintered thickness;

cooling said strip to substantially fix the thickness of said strip at said recovered thickness; and cutting said strip into individual separators for integration with the battery's electrochemically active elements and assembly into a battery container.

* * * * *